US012175823B2

(12) United States Patent
Carozzi

(10) Patent No.: US 12,175,823 B2
(45) Date of Patent: Dec. 24, 2024

(54) ARRANGEMENT FOR ACCESS SECURITY TO A PHYSICAL UNIT OF AN APPARATUS FOR HANDLING VALUE DOCUMENTS

(71) Applicant: Wincor Nixdorf International GmbH, Paderborn (DE)

(72) Inventor: Andrea Carozzi, Delbrück (DE)

(73) Assignee: Wincor Nixdorf International GmbH, Paderborn (DE)

(*) Notice: Subject to any disclaimer, the term of this patent is extended or adjusted under 35 U.S.C. 154(b) by 199 days.

(21) Appl. No.: 17/791,198

(22) PCT Filed: Jan. 4, 2021

(86) PCT No.: PCT/EP2021/050006
§ 371 (c)(1),
(2) Date: Jul. 6, 2022

(87) PCT Pub. No.: WO2021/144151
PCT Pub. Date: Jul. 22, 2021

(65) Prior Publication Data

US 2023/0033969 A1 Feb. 2, 2023

(30) Foreign Application Priority Data

Jan. 17, 2020 (EP) .................................... 20152357

(51) Int. Cl.
*G07D 11/225* (2019.01)

(52) U.S. Cl.
CPC .................................. *G07D 11/225* (2019.01)

(58) Field of Classification Search
CPC .... G07D 11/225; G07D 11/125; G07D 11/12; G07D 11/009; G09F 3/0329; G07F 7/04; G07F 9/026; G07F 9/02; G07F 19/202
See application file for complete search history.

(56) References Cited

U.S. PATENT DOCUMENTS

| | | | | |
|---|---|---|---|---|
| 4,313,601 | A | 2/1982 | Graef | |
| 5,012,075 | A * | 4/1991 | Hutchison ................ | G07F 9/06 109/43 |
| 10,249,125 | B2 | 4/2019 | Finkenzeller et al. | |
| 2004/0149537 | A1 * | 8/2004 | Pai .......................... | G07D 7/00 194/203 |

(Continued)

FOREIGN PATENT DOCUMENTS

| | | |
|---|---|---|
| DE | 3613552 A1 | 3/1987 |

OTHER PUBLICATIONS

International Search Report filed in the corresponding PCT Application dated Apr. 9, 2021, written in the German language; 3 pages.

(Continued)

*Primary Examiner* — William L Miller
(74) *Attorney, Agent, or Firm* — Black McCuskey

(57) ABSTRACT

An arrangement for securing access to a modular unit arranged outside a safe of a device for handling notes of value comprises a security element, which is fastened to a door of the safe, and an indicator for recording tampering with the security element connected to the safe door. The security element restricts access to the modular unit when the safe door is closed and does not restrict access when the safe door is open.

19 Claims, 5 Drawing Sheets

(56) References Cited

U.S. PATENT DOCUMENTS

Figure 1:
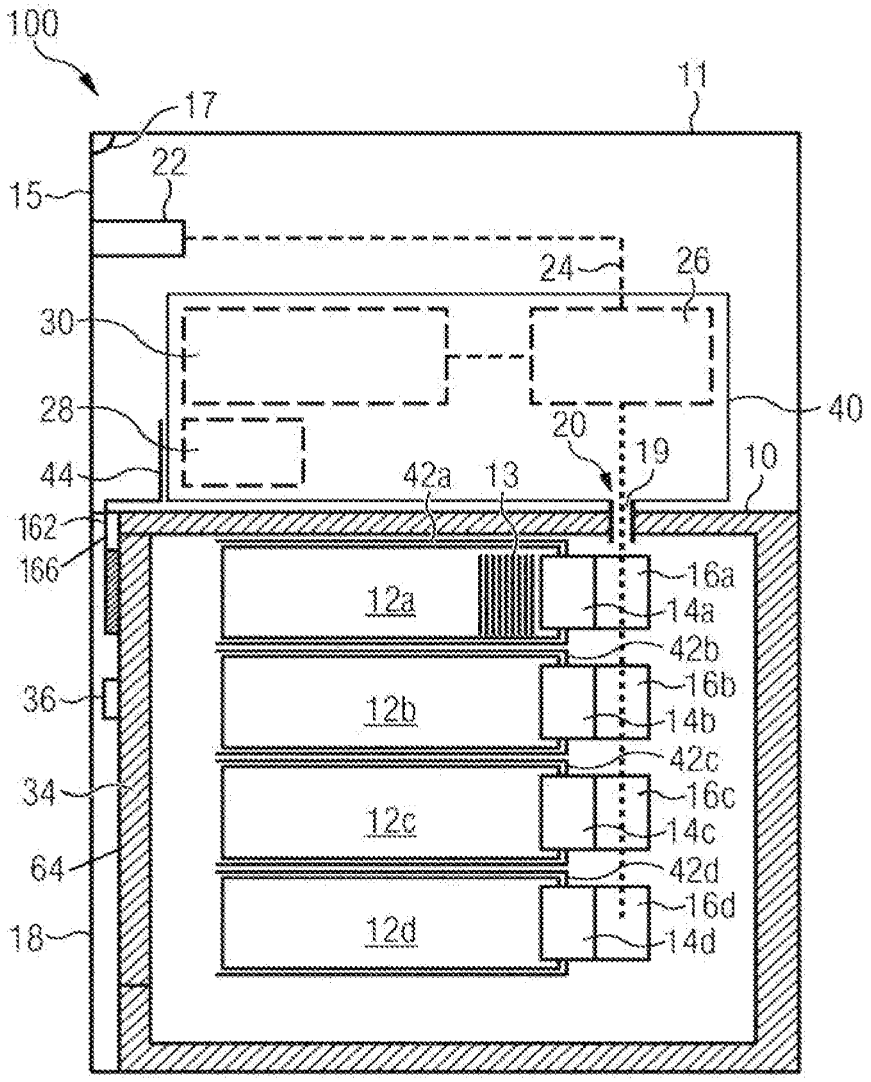

| | | | | |
|---|---|---|---|---|
| 2013/0082822 | A1* | 4/2013 | Levenick | G07F 19/209 340/5.73 |
| 2014/0299658 | A1* | 10/2014 | Houben | G07D 11/125 232/1 D |
| 2018/0313135 | A1* | 11/2018 | Westington | G07F 19/201 |
| 2019/0138864 | A1* | 5/2019 | Reyland | G06K 19/07798 |
| 2022/0020252 | A1* | 1/2022 | Fumanelli | G08B 13/1409 |
| 2022/0238044 | A1* | 7/2022 | Petryczka | G08B 13/2434 |

OTHER PUBLICATIONS

International Search Report filed in the corresponding PCT Application dated Apr. 9, 2021, translated to the English language; 2 pages.

Written Opinion filed in the corresponding PCT Application dated Apr. 9, 2021, written in the German language; 6 pages.

* cited by examiner

ARRANGEMENT FOR ACCESS SECURITY TO A PHYSICAL UNIT OF AN APPARATUS FOR HANDLING VALUE DOCUMENTS

CROSS-REFERENCE TO RELATED APPLICATIONS

This application is a National Phase filing of International Application Ser. No. PCT/EP2021/050006, for an ARRANGEMENT FOR ACCESS SECURITY TO A PHYSICAL UNIT OF AN APPARATUS FOR HANDLING VALUE DOCUMENTS, filed 4 Jan. 2021, which claims priority to European application 20152357.8, filed 17 Jan. 2020.

BACKGROUND

The invention relates to an arrangement for securing access to a modular unit arranged outside a safe of a device for handling notes of value.

In known devices for handling notes of value, an operator has access to external modular units of the device, for example an input and output compartment for inputting and outputting notes of value, when the device is used properly, and no access to internal modular units of the device, which are blocked by a housing door and housing cover. Service personnel of the bank or of the operator of the device, on the other hand, have access to internal modular units of the device, in particular access to modular units in the interior of a head module of the device, for example a buffer store, but do not have access to the interior of a safe of the device. Thus, the notes of value in the interior of the safe of the device are protected against unauthorized removal by the service personnel.

Nevertheless, the service personnel have access to the buffer store, which is arranged outside the safe in a head module and in which notes of value are stored temporarily outside the safe. In the event of tampering with the device by the service personnel, the service personnel can take notes of value from the buffer store of the device without permission, even without access to the interior of the safe. Furthermore, it is not possible to determine the unauthorized removal of notes of value from the buffer store in a timely manner since unrestricted access to modules in the head module of the device cannot be recorded.

SUMMARY

It is an object of the invention to provide an arrangement for securing access to a modular unit arranged outside a safe of a device for handling notes of value.

This object is achieved by an arrangement having the features disclosed herein. Advantageous embodiments are specified herein.

An arrangement for securing access to a modular unit arranged outside a safe of a device for handling notes of value comprises a security element, which is fastened to a door of the safe, and an indicator for recording tampering with the security element connected to the safe door, wherein the security element restricts access to the modular unit when the safe door is closed and does not restrict access when the safe door is open. This ensures that the modular unit is protected against unauthorized unrestricted access and tampering by a service person. In particular, the notes of value which the modular unit processes and temporarily stores in a buffer store are protected. Preferably, the buffer store can temporarily store notes of value that have been paid in and/or are to be paid out, in particular the buffer store can temporarily store notes of value which are not suitable for being paid out and/or paid-in notes of value which have been identified as not genuine by a reading unit and/or notes of value which have not been removed from an output compartment.

The arrangement comprises an indicator which records the tampering with the security element and indicates whether the security element has been tampered with. In particular, the indicator records detachment or bending away of a part of the security element or of the entire security element from the safe door.

It is advantageous if the modular unit processes notes of value and transports notes of value from and/or to the safe, and if the modular unit temporarily stores notes of value in a note buffer store. Furthermore, the modular unit can be arranged above the safe, preferably in a head module of the device. This enables the device to issue and/or accept notes of value more quickly, as well as to store notes of value which have been identified as not genuine and/or notes of value which have not been removed by an operator.

Furthermore, it is advantageous if the security element is welded, screwed and/or adhesively bonded to the safe door. As a result, the security element is rigidly connected to the safe door and permanently protects the modular unit of the device when the safe door is closed.

It is advantageous if the safe door is arranged in such a way that the safe door with the security element does not restrict access to the modular unit in an open state, in particular allows the modular unit to be pulled out of the device. As a result, access to the modular unit is also ensured when accessing the interior of the safe.

The indicator indicates the tampering with the security element and can be, for example, a seal label which is stuck to the security element and the safe door. If the security element is tampered with, the seal label may be damaged, destroyed and/or removed, thereby recording the tampering. Furthermore, the indicator can be a lead seal which, like the seal label, is connected to the security element and the safe door and records tampering in the event of damage, destruction and/or removal.

Alternatively or additionally, the indicator can be an electronic seal. The electronic seal can comprise a sensor for detecting tampering with the security element, in particular a monitoring switch. An indicating unit of the electronic seal indicates information about the tampering with the security element, in particular changes in a switching state of a sensor or of the monitoring switch. The electronic seal can furthermore be connected to a central control unit and/or indicating unit, in particular an alarm system, which signals the tampering with the security element without delay and then initiates the checking of the triggering security element.

It is advantageous if the security element has a predetermined breaking point. At a predetermined force on the security element, a part of the security element is then separated from the safe door. Furthermore, the predetermined breaking point can be arranged between the security element and the safe door, with the result that, at a predetermined force on the security element, the security element is separated from the safe door. In addition, the severed predetermined breaking point can serve as an indicator of tampering with the security element. The predetermined breaking point prevents other units of the device from being damaged or destroyed in the event of forcible tampering with the security element to get at the modular unit.

In an advantageous embodiment of the arrangement the security element has a first part which, when the safe door is closed, is arranged below the modular unit and has a second part which, when the safe door is closed, is arranged vertically in front of the modular unit, wherein the first part restricts bending away of the security element from the modular unit and the safe door, and the second part restricts access to the modular unit, in particular prevents the modular unit from being pulled out of the device. Tampering with the security element is thereby made more difficult and the security of the security element is increased.

It is advantageous to minimize the distance between the modular unit arranged above the safe and the safe to a value in the range of two to five times, preferably two to three times, the material thickness of the security element, in particular the material thickness of the first part of the security element. Bending away of the security element is thereby made more difficult or prevented.

BRIEF DESCRIPTIONS OF THE DRAWINGS

Further features and advantages will become apparent from the following description, which explains exemplary embodiments in greater detail in conjunction with the accompanying figures.

Figure 2:
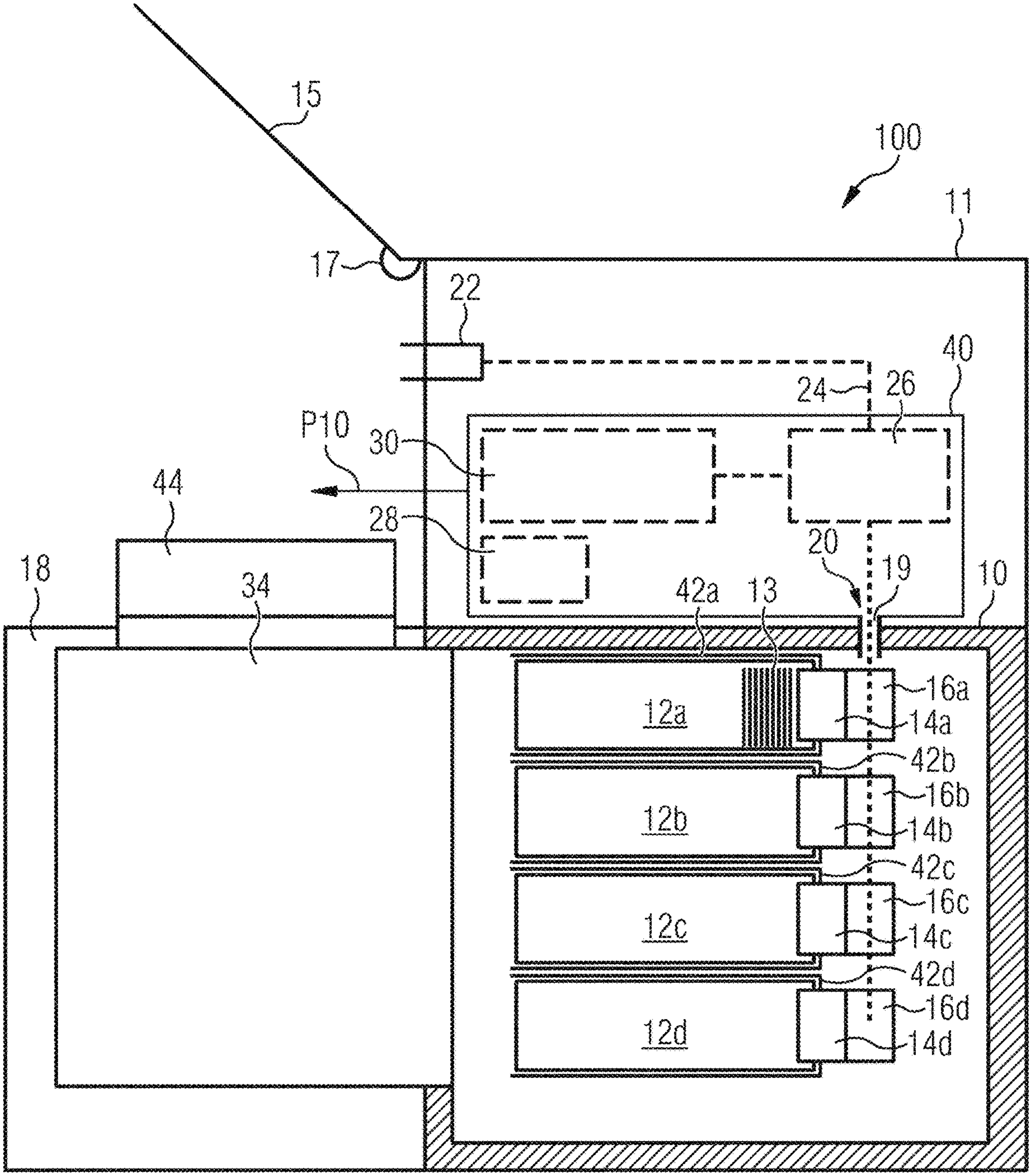
Figure 3:
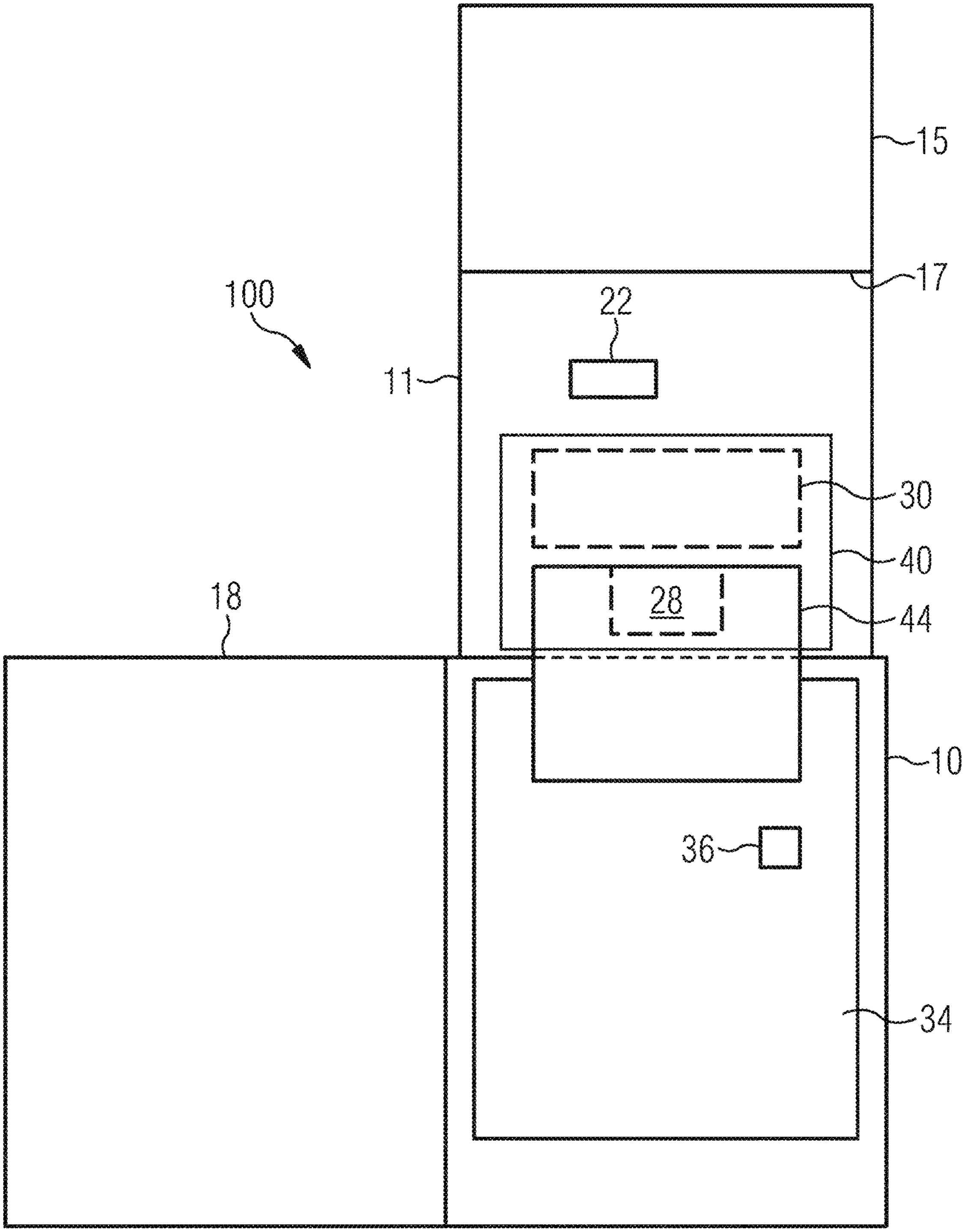
Figure 4:
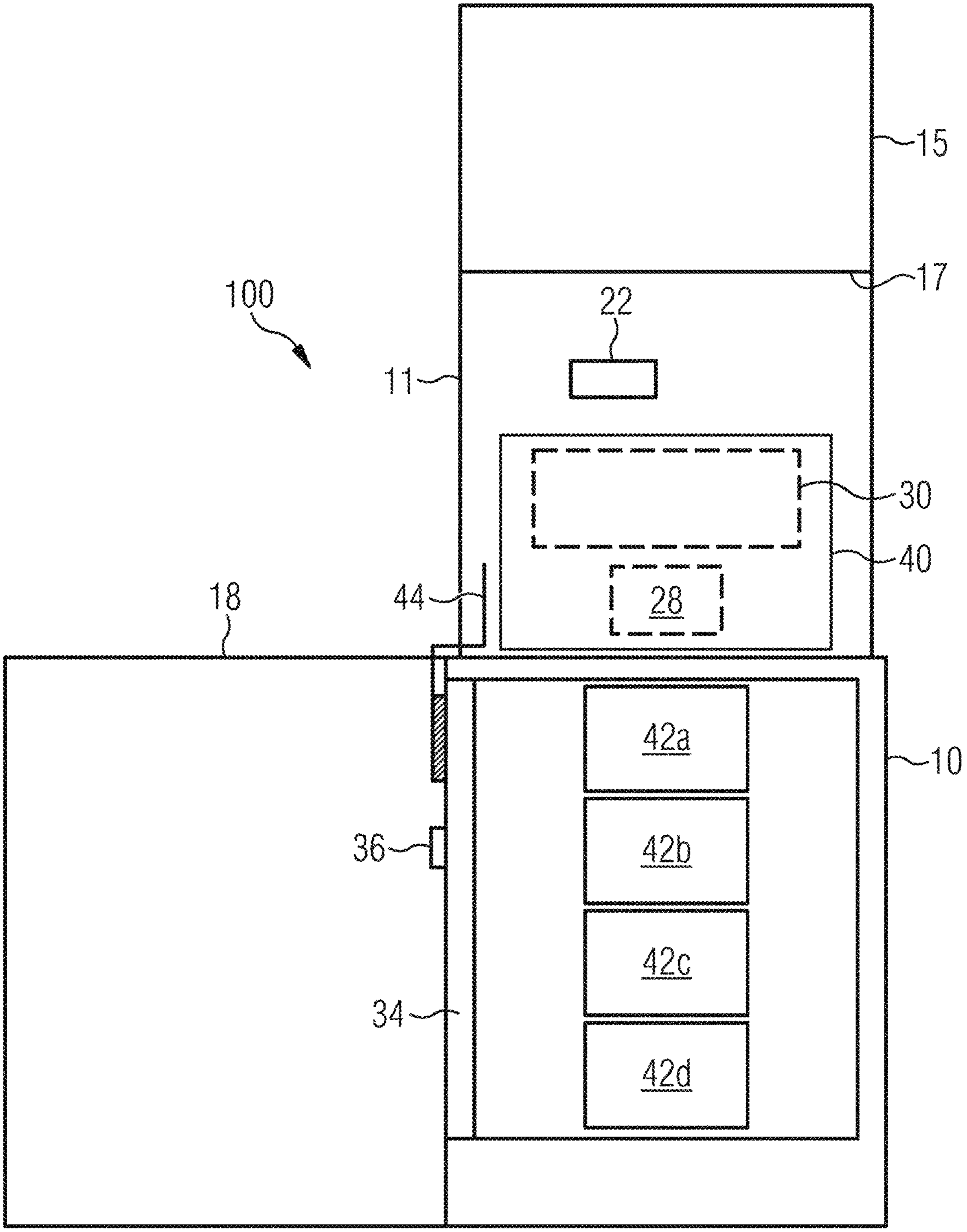
Figure 5:
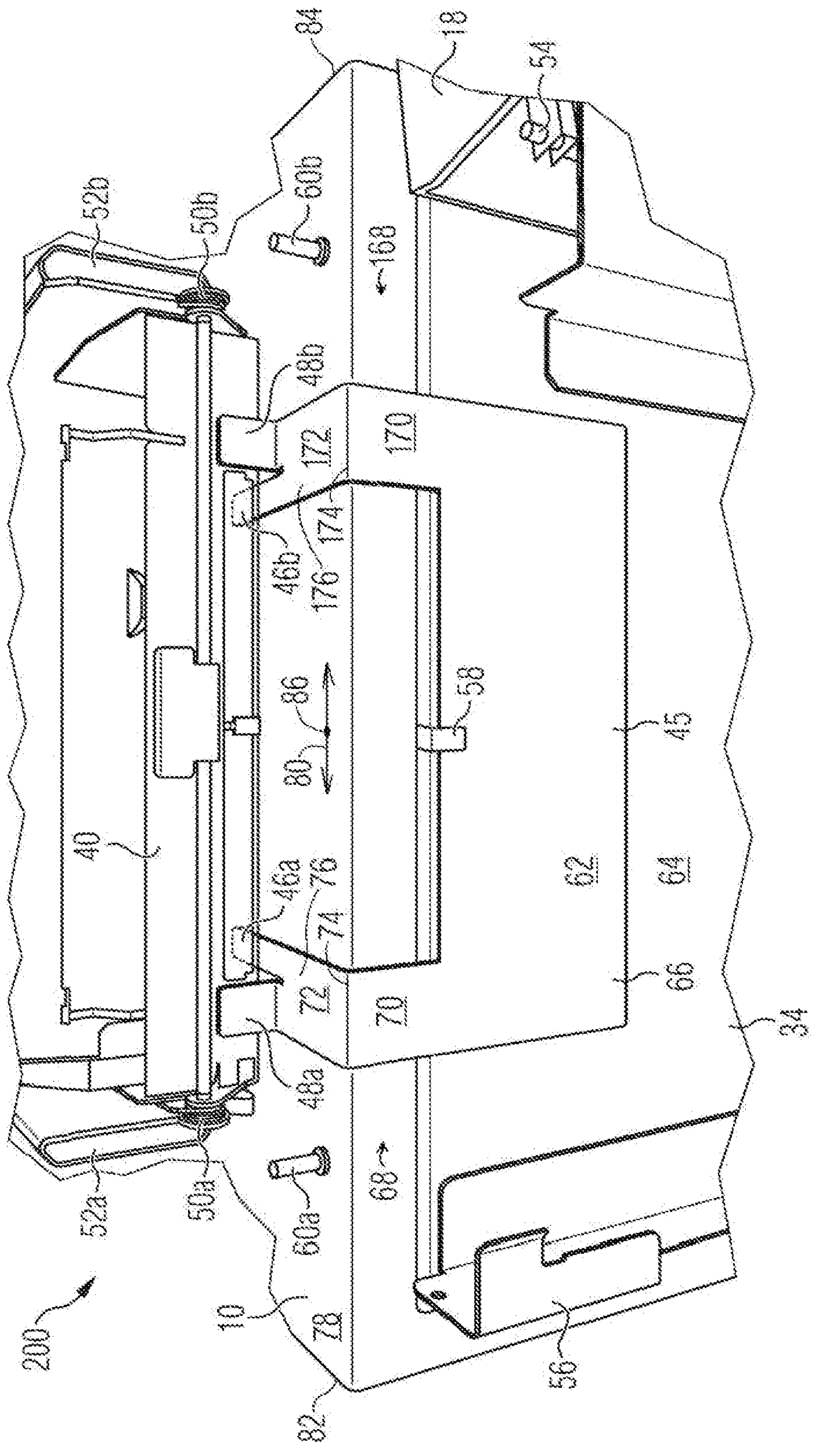

More specifically:

FIG. 1 shows a schematic side view of a device for handling notes of value in a first operating state according to a first embodiment, FIG. 2 shows a schematic side view of the device for handling notes of value according to FIG. 1 in a second operating state, FIG. 3 shows a schematic front view of the device for handling notes of value according to the preceding figures in a third operating state, FIG. 4 shows a schematic front view of the device for handling notes of value according to the preceding figures in the second operating state, and FIG. 5 shows a detail view of a device for handling notes of value according to a second embodiment.

DETAILED DESCRIPTION

FIG. 1 shows a schematic side view of a device 100 for handling notes of value in a first operating state according to a first embodiment. The device 100 serves both for the paying in of notes of value by an operator and for the paying out of notes of value to an operator and is also referred to as a recycling teller. Alternatively, the device 100 can also be used exclusively for paying out notes of value or for paying in notes of value. Furthermore, the device 100 can be a device for handling notes of value, in particular an automatic point of sale system or what is referred to as a secure automatic cash register.

The device 100 comprises a safe 10, in which four cash boxes 12*a* to 12*d* are arranged and which protects the cash boxes 12*a* to 12*d* from unauthorized access, in particular from theft and from attempts at tampering. The safe 10 has a safe door 34, which can be opened and closed by means of a closing unit 36. The cash boxes 12*a* to 12*d* are each arranged in a receiving compartment 42*a* to 42*d* in the safe 10.

Furthermore, the device 100 has a front housing flap 15 and a front housing door 18. The housing flap 15 is hinged to the remaining housing of the device 100 via a hinge 17 and can be pivoted upward by means of this hinge 17 in order to allow access to modular units 26, 28, 30, 40 in a head module 11 of the device 100, said head module being arranged above the safe 10. When the safe door 34, housing door 18 and housing flap 15 are closed, as illustrated in FIG. 1, the device 100 is in the first operating state.

The cash boxes 12*a* to 12*d* are used for storing and transporting notes of value, such as bank notes and/or checks. The notes of value are deposited in the cash boxes 12*a* to 12*d* in the form of a stack. One of these stacks is indicated, for example, in the first cash box 12*a*. One of the notes of this stack of notes of value is denoted, for example, by the reference sign 13. In the operating position of the cash boxes 12*a* to 12*d* which is shown in FIG. 1, the notes of value 13 in the cash boxes 12*a* to 12*d* are arranged upright on one of their edges, preferably on one of their longitudinal edges.

Each cash box 12*a* to 12*d* has a respective opening for feeding in notes of value 13 and for removing notes of value 13. Arranged in front of the opening of each cash box 12*a* to 12*d* there is a separating and stacking unit 14*a* to 14*d*, with the aid of which, on the one hand, notes of value 13 can be fed to the cash boxes 12*a* to 12*d* and, on the other hand, notes of value 13 which are stored in the cash boxes 12*a* to 12*d* can in each case be separated from the stacks of notes of value which are in each case accommodated in the cash boxes 12*a* to 12*d* and can be removed from the cash box 12*a* to 12*d*. Arranged in front of each separating and stacking unit 14*a* to 14*d* there is in each case one diverter 16*a* to 16*d*, with the aid of which a note of value 13 to be fed to the cash boxes 12*a* to 12*d* is diverted from the transport path 19 and fed to the separating and stacking unit 14*a* to 14*d* which is arranged in front of the cash box 12*a* to 12*d* into which the note of value 13 is to be transported.

Likewise, the diverters 16*a* to 16*d* are used to transport notes of value 13 which have been removed from the cash boxes 12*a* to 12*d* to the transport path 19. The safe 10 furthermore has an opening 20, through which notes of value 13 which are transported along the transport path 19 can be transported into the safe 10 or out of the safe 10.

The device 100 further comprises an input and output compartment 22, via which notes of value 13 which are to be paid in can be input into the device 100 by an operator and notes of value 13 which are to be paid out can be output to an operator. In the case of a pure cash dispenser, only the paying out of notes of value 13 takes place via the input and output compartment 22, and in the case of a pure paying-in machine, only the paying in of notes of value 13 takes place via the input and output compartment 22. The notes of value 13 can be transported between the input and output compartment 22 and a reading unit 26 with the aid of a first transport unit 24, which preferably comprises a plurality of transport elements.

The transportation of notes of value 13 along the transport path 19 from the reading unit 26 to the cash boxes 12*a* to 12*d* or from the cash boxes 12*a* to 12*d* to the reading unit 26 takes place with the aid of a second transport unit, which preferably comprises a plurality of transport elements. The notes of value 13 paid in via the input and output compartment 22 are separated and fed individually with the aid of the first transport unit 24 to the reading unit 26, with the aid of which the authenticity of the paid-in notes of value 13 and/or the nominal value and/or the serial number of each paid-in note of value 13 are/is determined.

Owing to the closed housing door 18 and the closed housing flap 15, an operator has no access to internal modular units of the device 100, in particular not to the safe 10 or other modular units 26, 28, 30, 40 of the head module 11 of the device 100. The modular unit 40 arranged above the safe 10 in the head module 11 comprises, in particular, the reading unit 26, the control unit 28 and a buffer store 30.

The buffer store 30 can temporarily store notes of value 13 that have been paid in and/or are to be paid out, in particular the buffer store 30 can temporarily store notes of value 13 which are not suitable for being paid out and/or paid-in notes of value 13 which have been identified as not genuine by the reading unit 26 or notes of value 13 which have not been removed by an operator. The buffer store 30 is, in particular, a roller store or an endless transport section.

In the exemplary embodiment of the device 100, a security element 44 is rigidly connected to the safe door 34 in a lower region of the security element 44. The security element 44 can be welded, screwed and/or adhesively bonded to the safe door 34. An upper part of the security element 44 projects upward beyond the safe door 34 and thus restricts access to the modular unit 40 when the safe door 34 is closed. In addition, the security element 44 is shaped in such a way in the upper part that, starting from the safe door 34, it is first bent horizontally toward the modular unit 40 and then is bent vertically upward in front of the modular unit 40. The security element 44 is produced from metal, plastic or a composite material. Alternatively, it is possible to use a security element 44 which is produced from other dimensionally stable materials and/or is shaped in some other way.

FIG. 2 shows a schematic side illustration of the device 100 according to FIG. 1 in a second operating state. Here, the device 100 has an open housing door 18 and an open housing flap 15, as well as an open safe door 34. In the second operating state, the modular unit 40 can be pulled out forward in the direction of the arrow P10 since the security element 44 no longer blocks, i.e. no longer restricts, pulling out when the safe door 34 is open. Thus, a person who has access to the interior of the safe 10 also has access to the modular unit 40. In a pulled-out state, the modular unit 40 can then be serviced, for example.

FIG. 3 shows a schematic front view of the device 100 according to the preceding figures in a third operating state with the housing flap 15 open, the housing door 18 open and the safe door 34 closed. As in the first operating state in FIG. 1, movement of the modular unit 40, in particular pulling out, is thus blocked by the security element 44 and hence access to the modular unit 40 is restricted. In particular, this means that it is not possible to access notes of value 13 which are stored in the buffer store 30 of the modular unit 40.

FIG. 4 shows a schematic front view 100 according to the preceding figures with the housing flap 15 open, the housing door 18 open and the safe door 34 open and thus corresponds to the second operating state as shown in FIG. 2. Since in this case the security element 44 does not block movement of the modular unit 40, access to the modular unit 40 is not restricted. The modular unit 40 can be pulled out of the device 100 and then serviced, for example.

Furthermore, provision is made to produce the security element 44 with a predetermined breaking point, with the result that a part of the security element 44 is detached from the safe door 34 at a predetermined force on the security element 44. Alternatively, it is possible to provide a predetermined breaking point in the connection between the security element 44 and the safe door 34, with the result that the security element 44 is detached from the safe door 34 at a predetermined force on the security element 44.

In all the embodiments, an indicator is provided for recording tampering, although no indicator is shown in FIGS. 1 to 4. In the event of tampering with the security element 44 and/or destruction of the security element 44, the indicator allows this tampering and/or destruction to be demonstrated. The indicator can be the predetermined breaking point, a seal label, a lead seal and/or an electronic seal.

A seal label is, for example, a sticker which is applied to the security element 44 and the safe door 34, for example by adhesive bonding, and which is severed, destroyed and/or removed if the security element 44 is tampered with, for example if the security element 44 is bent away, removed and/or destroyed. The severing and/or destruction of the seal label is irreversible and clearly recognizable, and the tampering with the security element 44 is thus recorded. When the seal label is removed, the seal label is destroyed and tampering with the security element 44 is recorded by virtue of the absence of the seal label. Seal labels are also referred to as adhesive seals or adhesive security tapes.

Alternatively, the indicator can be a lead seal which is connected to the security element 44 and the safe door 34. As in the case of the seal label, tampering with the security element 44 is recorded by irreversible severing, destruction and/or removal of the lead seal.

Furthermore, the indicator can be an electronic seal. The electronic seal has a sensor for detecting tampering with the security element 44, e.g. with the aid of a monitoring contact. A change in a switching state of the monitoring contact is caused by tampering with the security element 44, for example by the security element 44 being bent away, removed and/or destroyed. This change in the switching state is then indicated by means of an indicating unit, and the tampering with the security element 44 is recorded.

The electronic seal can furthermore be connected to a central control unit and/or indicating unit, in particular an alarm system, which signals the tampering with the security element without delay and then initiates the checking of the triggering security element.

In all the embodiments, it is envisaged that the indicator, in particular a lead seal or a seal label, is irreversibly destroyed and tampering is thus recorded only if the security element 44 is tampered with. During correct operation of the device 100, the seal label or the lead seal is not destroyed, or the switching state of the electronic seal is not changed.

FIG. 5 shows a detail view of a section of a device 200 for handling notes of value according to a second embodiment. Elements of the same construction and/or the same function have the same reference signs. In the view illustrated, the housing door 18 and the housing flap 15 of the device 200 are open and the safe door 34 is closed. In the case of the device 200, the security element 45 is shaped in such a way that it has at least one first part **46*a* and 46*b* which, when the safe door 34 is closed, is arranged below the modular unit 40 and has at least one second part 48*a* and 48*b* which is arranged vertically in front of one side of the modular unit 40, wherein the first part 46*a* and 46*b* restrict bending away of the security element 45 from the modular unit 40 and the safe door 34, and the second part 48*a* and 48*b* restricts access to the modular unit 40, in particular prevents the modular unit 40 from being pulled out of the device 200 when the safe door 34 is closed. In FIG. 5, the security element 45 has two first parts 46*a* and 46*b* and two second parts 48*a* and 48*b* respectively, of which a first part 46*a* and 46*b* and a second part 48*a* and 48*b* are each arranged on the left and right on a front side of the modular unit 40. The modular unit 40 is preferably arranged above the safe 10 in such a way that the distance between the modular unit 40 and the safe 10 has a value in the range of two to five times, preferably two to three times, the material thickness of the security element 45, in particular the material thickness of the first parts 46*a* and 46*b* of the security element 45**.

When the safe door 34 is closed, the modular unit 40 is also in a pushed-in position and can be locked in the pushed-in position with the aid of a closure mechanism 50*a* and 50*b*. When the safe door 34 is open, the security element 45 is pivoted to the side together with the safe door 34 and makes it possible to pull out the modular unit 40 with the aid of pull-out rails 52*a* and 52*b*.

FIG. 5 furthermore shows a hinge 54 of the housing door 18, with the aid of which the housing door 18 can be moved into an open and/or closed state, and a part of the locking mechanism 56 of the housing door 18, with the aid of which the housing door can be locked in a closed state. In addition, the housing flap 15 can be locked in a closed state with the aid of locking pins 60*a* and 60*b*.

In FIG. 5, the device 200 furthermore has an indicator for recording tampering. In FIG. 5, this indicator is designed as a seal label 58. Alternatively, the indicator can be embodied as a lead seal and/or as an electronic seal and/or as a predetermined breaking point.

The seal label 58 is attached in such a way that bending away and/or removing the security element 45 from the safe door 34 destroys the seal label 58 and thus records tampering with the security element 45.

As FIG. 5 shows, the security element 45 includes a plate portion 62 directly fastened to the door 34 of the safe 10, as FIG. 1 shows the security element 44 including a plate portion 162 directly fastened to the door 34 of the safe 10. FIGS. 1 and 5 also show the respective plate portions 62, 162 extending in a first plane that is parallel to and spaced from an outer surface 64 of the door 34. The exemplary first plane is defined by the outwardly facing surface of the respective plate portions 62, 162, visible as edge and referenced at 166 in FIG. 1 and as surface in perspective view and referenced at 66 in FIG. 5.

FIG. 5 also shows the exemplary security element 45 includes a first arm 68 and a second arm 168 each respectively having a first portion 70, 170 extending from the plate portion 62 in the first plane and a second portion 72, 172 extending from the respective first portion 70, 170 in a second plane that is transverse to the first plane whereby a respective elbow 74, 174 is defined between the respective first portion 70, 170 and the respective second portion 72, 172. FIG. 5 also shows the exemplary second plane is defined by upwardly facing surfaces 76, 176 of the second portions 72, 172.

FIG. 5 also shows that the first arm 68 and the second arm 168 also each respectively have the first part or first finger 46*a*, 46*b* extending from a distal end of the second portion 72, 172 and extending in the second plane and also have a second part or second finger 48*a*, 48*b* extending from the distal end of the second portion 72, 172 in a third plane that is parallel to and spaced from the first plane. FIG. 5 also shows the first fingers 46*a*, 46*b* extend between a top surface of the safe 10 and the modular unit 40 and thus under the modular unit 40, as the tips of the first fingers 46*a*, 46*b* are shown in solid line prior to reaching the modular unit 40 and shown in phantom after passing an edge of the modular unit 40.

FIG. 5 also shows the top surface 78 of the safe 10 extending along a horizontal axis 80 between a first lateral side 82 and a second lateral side 84, wherein the horizontal axis 80 is parallel to the first plane and the second plane, and wherein a midpoint 86 along the horizontal axis 80 is equidistant to both of the first lateral side 82 and a second lateral side 84. FIG. 5 also shows the pull-out rails 52*a*, 52*b* support the modular unit 40, wherein the modular unit 40 extends between a forward side and rearward side and is pullable out of the device 200 in a forward direction while riding on the pull-out rails 52*a*, 52*b*, and wherein the second fingers 48*a*, 48*b* extend away from the top surface 78 of the safe 10 in front of the forward side of the modular unit 40 when the door 34 is closed.

FIG. 5 also shows the first finger 46*a* and the second finger 48*a* are both adjacent to and spaced from one another along the horizontal axis 80. FIG. 5 also shows the first finger 46*a* is closer to the midpoint 86 along the horizontal axis 80 than the second finger 48*a*. FIG. 5 also shows the first arm 68 and the second arm 168 are opposite sides of the midpoint 86 along the horizontal axis 80. FIG. 5 also shows the first finger 46*a* of the first arm 68 is closer to the midpoint 86 along the horizontal axis 80 than the second finger 48*a* of the first arm 68 and the first finger 46*b* of the second arm 168 is closer to the midpoint 86 along the horizontal axis 80 than the second finger 48*b* of the second arm 168. FIG. 5 also shows the indicator 58 is connected to the plate portion 62 and extends from the plate portion 62 between the first arm 68 and the second arm 168 and extends to the door 34.

The invention claimed is:

1. An arrangement for securing access to a modular unit arranged outside a safe of a device for handling notes of value comprising:

a security element fastened to a door of the safe, wherein the door is openable and closable by a closing unit of the device for handling notes of value, wherein the security element restricts access to the modular unit when the safe door is closed and does not restrict access to the modular unit when the door is open, and the arrangement further comprising:

an indicator connected with the security element and with the door, the indicator severable when the security element is one of bent away, removed, and destroyed, wherein the security element has a first part which, when the door is closed, is arranged below the modular unit and has a second part which, when the door is closed, is arranged vertically in front of the modular unit, wherein the first part restricts bending away of the security element from the modular unit and the door, and the second part restricts access to the modular unit, by preventing the modular unit from being pulled out of the device for handling notes of value.

2. The arrangement as claimed in claim 1 wherein the modular unit is configured to process the notes of value and transport the notes of value to at least one of from and to the safe, and temporarily store the notes of value in a note buffer store of the modular unit.

3. The arrangement as claimed in claim 1 wherein the security element is one of welded, screwed, and adhesively bonded to the door.

4. The arrangement as claimed in claim 1 wherein the indicator is one of a seal label, a lead seal, and an electronic seal.

5. The arrangement as claimed in claim 4, wherein the indicator is the electronic seal and the electronic seal has a sensor.

6. The arrangement as claimed in claim 5, characterized in that the sensor is a monitoring switch.

7. The arrangement as claimed in claim 1 wherein the modular unit is pullable out of the device for handling notes of value when the door is open.

8. The arrangement as claimed in claim 1 wherein the modular unit is arranged above the safe in a head module of the device for handling notes of value.

9. An arrangement for securing access to a modular unit arranged outside a safe of a device for handling notes of value comprising:

a security element fastened to a door of the safe, wherein the door is openable and closable by a closing unit of the device for handling notes of value, wherein the security element restricts access to the modular unit when the safe door is closed and does not restrict access to the modular unit when the door is open, and the arrangement further comprising:

an indicator connected with the security element and with the door, the indicator severable when the security element is one of bent away, removed, and destroyed, wherein the security element further comprises:

a plate portion directly fastened to the door of the safe and extending in a first plane that is parallel to and spaced from an outer surface of the door; and at least one arm having a first portion extending from the plate portion in the first plane and a second portion extending from the first portion in a second plane that is transverse to the first plane, whereby an elbow is defined between the first portion and the second portion, the at least one arm further including:

a first finger extending from a distal end of the second portion and extending in the second plane; and a second finger extending from the distal end of the second portion in a third plane that is parallel to and spaced from the first plane.

10. The arrangement of claim 9 wherein the first finger extends between the safe and the modular unit.

11. The arrangement of claim 10 further comprising:

pull-out rails supporting the modular unit wherein the modular unit extends between a forward side and rearward side and is pullable out of the device in a forward direction while riding on the pull-out rails, and wherein the second finger extends away from a top of the safe and in front of the forward side when the door is closed.

12. The arrangement of claim 9 wherein the first finger and the second finger are both adjacent to and spaced from one another along a horizontal axis that extends across a top of the safe and is parallel to the first plane and the second plane.

13. The arrangement of claim 12 wherein the safe extends along the horizontal axis between a first lateral side and a second lateral side, and a midpoint along the horizontal axis is equidistant to both of the first lateral side and a second lateral side, wherein the first finger is closer to the midpoint along the horizontal axis than the second finger.

14. The arrangement of claim 9 wherein the first finger extends under the modular unit.

15. The arrangement of claim 9 wherein the at least one arm further comprises a first arm and a second arm each having the first portion extending from the plate portion in the first plane and the second portion extending from the first portion in a second plane that is transverse to the first plane, whereby the elbow is defined between the first portion and the second portion.

16. The arrangement of claim 15 wherein a top of the safe extends along a horizontal axis between a first lateral side and a second lateral side, wherein the horizontal axis is parallel to the first plane and the second plane, wherein a midpoint along the horizontal axis is equidistant to both of the first lateral side and a second lateral side, and wherein the first arm and the second arm are opposite sides of the midpoint along the horizontal axis.

17. The arrangement of claim 16 wherein the first finger of the first arm is closer to the midpoint along the horizontal axis than the second finger of the first arm and wherein the first finger of the second arm is closer to the midpoint along the horizontal axis than the second finger of the second arm.

18. The arrangement of claim 16 wherein the indicator is connected to the plate portion and extends from the plate portion between the first arm and the second arm and extends to the door.

19. The arrangement of claim 15 wherein both of the first finger of the first arm and the first finger of the second arm extends under the module unit.

* * * * *